(12) United States Patent
Attar

(10) Patent No.: US 8,416,404 B2
(45) Date of Patent: Apr. 9, 2013

(54) METHOD AND SYSTEM FOR MEASUREMENT AND CORRECTION OF THERMALLY INDUCED CHANGES OF BORESIGHT, EFFECTIVE FOCAL LENGTH, AND FOCUS

(75) Inventor: Ziv Attar, Zichron Yaakov (IL)

(73) Assignee: Rafael Advanced Defense Systems Ltd., Haifa (IL)

( * ) Notice: Subject to any disclaimer, the term of this patent is extended or adjusted under 35 U.S.C. 154(b) by 0 days.

(21) Appl. No.: 12/600,643

(22) PCT Filed: May 22, 2008

(86) PCT No.: PCT/IL2008/000695
§ 371 (c)(1),
(2), (4) Date: Apr. 20, 2010

(87) PCT Pub. No.: WO2008/142692
PCT Pub. Date: Nov. 27, 2008

(65) Prior Publication Data
US 2010/0241385 A1     Sep. 23, 2010

(30) Foreign Application Priority Data

May 24, 2007 (IL) .......................................... 183389

(51) Int. Cl.
*G01N 21/00* (2006.01)
*G01B 9/00* (2006.01)
*G01M 11/00* (2006.01)

(52) U.S. Cl.
USPC ...................... 356/241.1; 356/125; 356/124.5

(58) Field of Classification Search .......... 356/123–127, 356/241.1–6, 250–252
See application file for complete search history.

(56) References Cited

U.S. PATENT DOCUMENTS

| 5,137,363 A | * | 8/1992 | Kosugi et al. ................ 356/401 |
| 5,663,563 A | | 9/1997 | Herbst et al. |
| 6,726,329 B2 | * | 4/2004 | Li et al. ........................... 353/20 |

FOREIGN PATENT DOCUMENTS

| BE | 1009299 A3 | | 2/1997 |
| GB | 2170340 | * | 1/1985 |

* cited by examiner

*Primary Examiner* — Tarifur Chowdhury
*Assistant Examiner* — Sunghee Y Gray
(74) *Attorney, Agent, or Firm* — Merchant & Gould P.C.

(57) ABSTRACT

A method and system are for measuring and correcting shifts in the boresight, effective focal length, and focus of an optical system that are caused by temperature variations. The method can be used for systems which can be expected to operate in situations where the temperature variations are large, e.g. a FLIR system of a fighter plane, and also where the temperature variations can be very small however high accuracy is needed. The invention is based on placing radiation emitting sources before and as close as possible to the first optical element of the optical system and measuring the thermally induced shifts of the locations of the images of the radiation emitting sources on the surface of the detector of the optical system.

16 Claims, 3 Drawing Sheets

METHOD AND SYSTEM FOR MEASUREMENT AND CORRECTION OF THERMALLY INDUCED CHANGES OF BORESIGHT, EFFECTIVE FOCAL LENGTH, AND FOCUS

This application is a National Stage Application of PCT/IL2008/000695, filed 22 May 2008, which claims benefit of Serial No. 183389, filed 24 May 2007 in Israel and which applications are incorporated herein by reference. To the extent appropriate, a claim of priority is made to each of the above disclosed applications.

FIELD OF THE INVENTION

The present invention relates to optical systems. More particularly, the present invention relates to the measurement and correction of the changes in the boresight, effective focal length, and focus of an optical system that are caused by temperature variations.

BACKGROUND OF THE INVENTION

Optical systems are often used in situations in which the ambient temperature of the immediate surroundings and thus of the system itself is not constant or is different from that at which the system was calibrated. One result of the changes in temperature is that the index of refraction of the optical elements of the system changes. Also the optical elements and particularly the support members that hold the elements in position relative to each other expand, contract and sometimes twist or are otherwise distorted. The cumulative effect of the thermally induced changes for each of the individual optical and mechanical elements is to cause a change in the effective focal length of the system and a shifting of the image on the detector. The change in effective focal length of the system is physically manifested as an expansion or shrinkage of the image size on the detector. The shifting of the image is known as the boresight phenomena, which is manifested as translation of the image on the face of the detector.

A typical example of an optical system for which the invention is intended is an optical system mounted on an airplane, missile, spacecraft, or satellite. All of these platforms operate in extreme environmental situations in which ambient temperature in which the optical system functions can be very different from that in the factory or laboratory in which the optical system was assembled and calibrated. Furthermore the ambient temperature can change rapidly and over a large range of values as a function of time. It is clear that in order to be able to accurately relate the information contained in the images obtained from the optical system with the actual scene being viewed it is necessary to correct for the thermal induced changes in boresight and effective focal length.

Conventional solutions to focal length drift in optical systems, particularly to temperature-induced focal length drift, generally involve the application of multiple lens and/or mirror arrays and/or electro-mechanical assemblies. One method is to introduce one or more temperature sensors, for example a thermocouple, into the system. Electro-mechanical assemblies are provided to move individual elements of the optical assembly in response to signals from the temperature sensor indicating that a change in temperature and/or in the temperature gradient over the optical element has taken place. Other methods rely on choosing the materials of which the optical elements are made so the temperature induced effects are cancelled out. A third approach is to electronically compensate for the change in effective focal length by using a temperature sensor to measure an average temperature of the elements of the optical sensor and to use the measured temperature to influence the way in which the signals that make up the detected image are processed.

An example of an electronic effective focal length compensator is disclosed in U.S. Pat. No. 5,663,563. The optical system is of a thermal imaging unit, which comprises optics that channels electromagnetic energy representing information from a distant scene onto a scanner that reflects the energy to an imager assembly that images the scene onto a detector assembly. The imager assembly includes a temperature sensor for sensing the imager assembly lens temperature. The output of the detector elements is the input to a readout integrated circuit that is part of the electronics associated with the detector assembly. The readout integrated circuit includes a time delay and integration clock, a multiplexer, and another clock for the multiplexer. The compensator includes a processor unit for controlling the various processes that take place in order to gather, process, and display the images. According to the teachings of U.S. Pat. No. 5,663,563, the effective focal length is compensated for by means of instructions programmed into the processor. These instructions allow the processor to control the rate of the multiplexer clock according to the temperature changes measured by the temperature sensor.

It is an object of the present invention to provide a method and system for compensating for thermally induced effective focal length and boresight changes that does not require accurate and constant temperature measurements.

It is another object of the present invention to provide a method and system for compensating for thermally induced effective focal length and boresight changes that does not require complicated calibration functions.

It is an object of the present invention to provide a method and system, which can be incorporated into various applications and optical systems operating at different electromagnetic wavelength ranges, to compensate for thermally induced effective focal length and boresight changes that.

Other characteristics and advantages of the invention will become apparent as the description proceeds.

SUMMARY OF THE INVENTION

In a first aspect the invention is a method for measuring and correcting the shift in the boresight, effective focal length, and/or focus of an optical system that is caused by temperature variations. The method comprises the steps o:
  (a) providing one or more radiation emitting sources;
  (b) fixedly attaching the radiation emitting sources to the support frame or to the first optical element of the optical system such that they are located in front of and near the outer edge of the first optical element;
  (c) providing means to limit the size of the footprint of the radiation emitting sources on the first optical element of the optical system when the radiation emitting sources are activated;
  (d) activating the radiation sources and measuring in a selected coordinate system the initial locations of the center and/or the initial size of the images of the radiation emitting sources that are formed on the detector, wherein the measurements are made with the optical system at standard temperature;
  (e) activating the radiation sources and measuring in the selected coordinate system the shifted locations of the center and/or the new size of the images of the radiation emitting sources that are formed on the detector, wherein the measurements are made with the optical system at a temperature that is different from the standard temperature;

(f) calculating the shifts $dx_i$ and $dy_i$ between the initial locations and the shifted locations along the X and Y axis of the selected coordinate system and/or measuring the changes in size of the images of the radiation emitting sources;

(g) measuring and correcting the shift in the boresight and the effective focal length of the optical system that is caused by the change from the standard temperature to the different temperature; and/or (h) correcting the shift of focus of the optical system that is caused by the change from the standard temperature to the different temperature.

The radiation emitting source can be resistors or photodiodes, which are activated by causing an electric current to flow through it. In some embodiments, the means to limit the size of the footprint of the radiation emitting source can be a pinhole located in front of and close to the radiation emitting source; in other embodiments it can be a lens located a distance equal to its focal length in front of the radiation emitting source.

In the preferred embodiment, the selected coordinate system is a Cartesian coordinate system having its origin at the center of the pixel array of the detector.

According to the method of the invention the shift of the boresight value along the X axis and Y axis respectively of the selected coordinate system is calculated from the average of the translations of the images of the radiation emitting sources according to the following formulas:

$$\text{boresight\_}x = (dx_1 + dx_2 + \ldots + dx_n)/n$$

$$\text{boresight\_}y = (dy_1 + dy_2 + \ldots + dy_n)/n$$

According to the method of the invention, for two radiation emitting sources, the shift of the effective focal length ($\Delta$effl) along the X axis and Y axis respectively of the selected coordinate system is calculated from the average of the translations of the images of the radiation emitting sources according to the following formula: $\Delta\text{effl} = (dy_1 - dy_2)/2$.

According to the method of the invention, for four radiation emitting sources, the shift of the effective focal length ($\Delta$effl) along the X axis and Y axis respectively of the selected coordinate system is calculated from the average of the translations of the images of the radiation emitting sources according to the following formula:

$$\Delta\text{effl} = (dy_1 - dy_2 + dx_3 - dx_4)/4.$$

According to the method of the invention correcting the shift of focus of the optical system is done by:

(a) determining the differential changes from the initial size of each of the images of the radiation emitting sources;

(b) averaging over the differential changes in size;

(c) adjusting the lens assembly of the optical system to shift the focus; and, optionally (d) repeating steps (a) to (c) one or more times to minimize the differential changes in size.

The processor used to carry out the method of the invention can be either a dedicated unit or that of the optical system, wherein the necessary additions have been made to the software of the processor to enable the method of the invention to be carried out.

The radiation emitting sources can be activated continuously or intermittently, wherein frequency and duty cycle at which the radiation emitting sources are activated is determined as a function of one or more of the following: time, temperature, temperature change, or image quality.

According to the method of the invention the accuracy of the measured values of the shifts of location of the images of the radiation emitting sources and of the image size for focus correction can be improved by averaging over the coordinates and sizes from several consecutive picture frames.

In another aspect, the invention is a system for measuring and correcting the shift in the boresight, effective focal length, and/or focus of an optical system that is caused by temperature variations. The system comprises:

(a) one or more radiation emitting sources that are fixedly attached to the support frame or to the first optical element of the optical system such that they are located in front of and near the outer edge of the first optical element; and (b) a processor comprising software that enables the method of the invention to be carried out.

BRIEF DESCRIPTION OF THE DRAWINGS

Illustrative and non-limitative examples of preferred embodiments of the invention will now be described with reference to the accompanying drawings, in which.

DETAILED DESCRIPTION OF PREFERRED EMBODIMENTS

The present invention is a method and system for measuring and correcting shifts in the boresight, effective focal length, and focus of an optical system that are caused by temperature variations. The method of the invention can be used for systems which can be expected to operate in situations where the temperature variations are large, e.g. a FLIR system of a fighter plane, and also where the temperature variations can be very small however high accuracy is needed. The method and system of the invention can be used with applications and optical systems operating in any electromagnetic wavelength range e.g. visual light scenes and infra-red radiation imaging.

The invention is intended for use with optical systems intended to gather information from a scene located a far distance from the first optical element of the system, i.e. optically the object being viewed is at infinity. Typically such systems contain a plurality of optical elements mounted on a support frame; an electronic detector, e.g. CCD; electronic circuits; a communication interface to receive and send information to other systems either located nearby or remote from the optical system; and a processor, which performs many tasks including: controlling the operation of the optical system, receiving and storing signals from the detector, partially or totally processing the signals received from the detector, and interacting with the communication interface.

Figure 1:
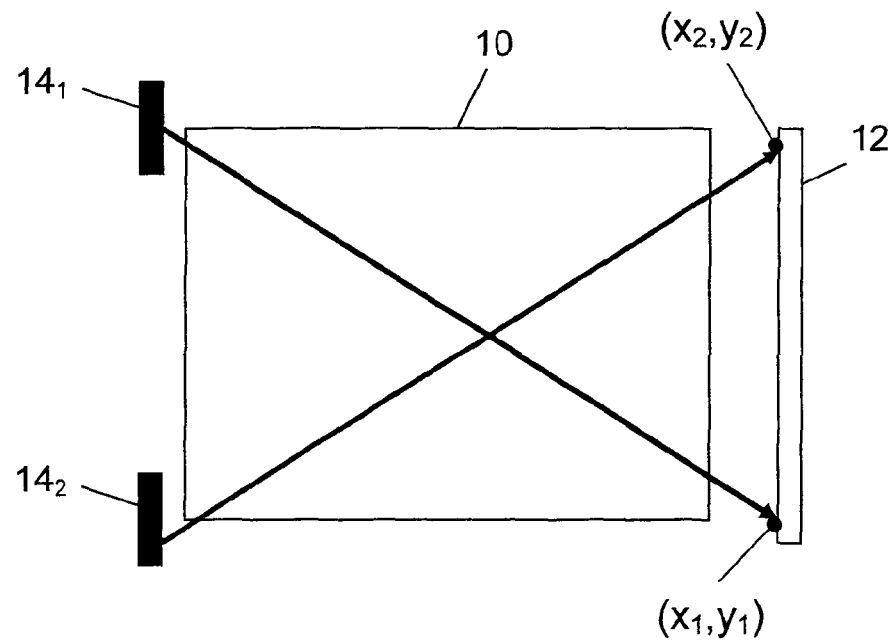
FIG. 1 schematically shows the physical arrangement of the system of the invention.

The physical arrangement of the system of the invention is schematically shown in FIG. 1. The nature, number, and arrangement of the components of optical system 10 are immaterial to the invention; therefore it is represented only by the empty box labeled with reference numeral 10. The system of the invention comprises a plurality of radiation emitting sources $14_i$ (two sources $14_1$, $14_2$ are shown in FIG. 1) located before and as close as possible to the first optical element of optical system 10. Radiation emitting sources $14_i$ are either fixedly attached to the support frame of the optical system near the outer edge of the first optical element or are fixed to the first optical element itself.

The location of the radiation emitting sources $14_1$, $14_2$ is important for two reasons. The first reason is that from this location the emitted radiation will travel the entire optical path through the system that is followed by the radiation from the object scene being viewed from the objective to detector 12. Consequently the thermally induced changes of the entire system can be corrected simultaneously instead of having to make separate corrections for the individual elements of the system. The second reason is that positioning radiation sources 14 near the edge of the first optical element will cause their images to be formed on the outer edges of detector 12. For many optical systems 10 this part of the detector is not used for the detection of the image of the scene, thereby allowing the radiation sources to be activated simultaneously with the viewing of the distant scene.

The radiation emitting sources can be any small light source known in the art and capable of producing electromagnetic radiation in the spectral range appropriate for the optical system and detector. The preferred sources comprise an appropriate resistor or photodiode through which to an electric current is caused to flow. Theoretically only one source 14 can be used if it is desired only to determine and correct for the change in effective focal length. However a pair of sources is needed to separate and measure the boresight effect and preferably at least two pairs are used as shown in FIG. 2.

Figure 5:
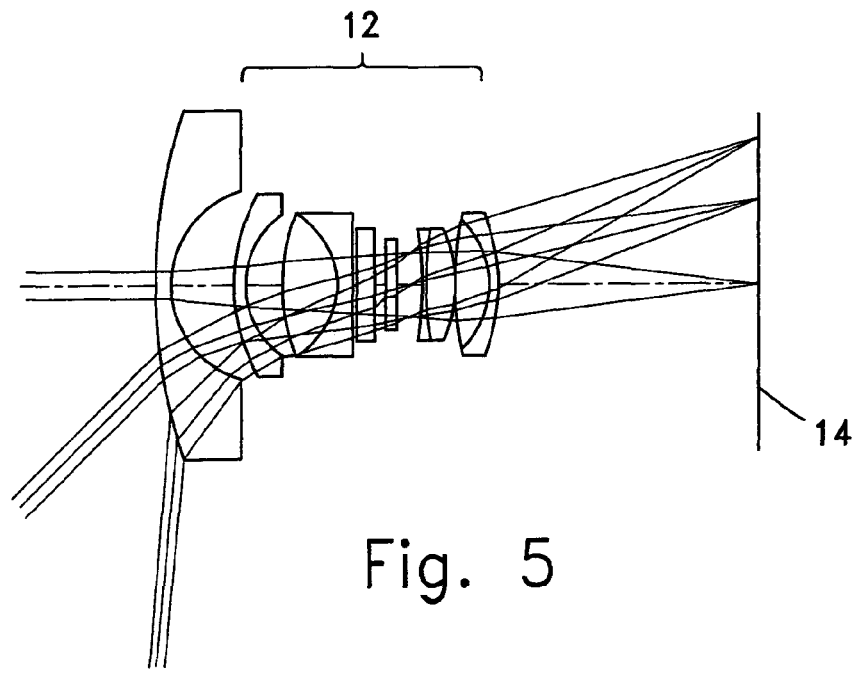
FIG. 5 shows an example of an optical system having a wide field of view.
Figure 6:
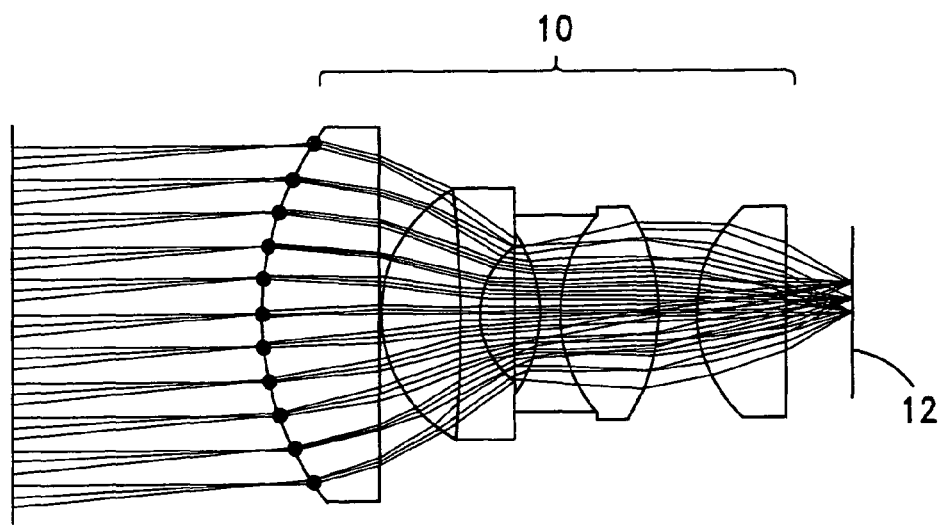
FIG. 6 shows an example of an optical system having a narrow field of view.

Because the source is located near the lens and not at infinity, optical system 10 will focus the light from each radiation source $14_i$ to a blurred spot $(x_i, y_i)$ on the detector 12 rather than to a point as in the case of a source at infinity. If the area of the footprint of the radiation emitting source on the front lens is much smaller than the area of the lens, then a phenomenon known as pupil wandering takes place. This is common for optical systems having a wide field of view, such as the example of an optical system shown in FIG. 5. In this case the method of the invention can take place with no special arrangements necessary to limit the footprint of the radiation emitting sources on the front lens. On the other hand, if the footprint of the radiation emitting source is approximately equal to the area of the lens, then the image of the source on the detector will be very large and it will not be possible to carry out the method of the invention. The latter situation is typical of optical systems having a narrow field of view, such as that shown in FIG. 6

Figure 3:
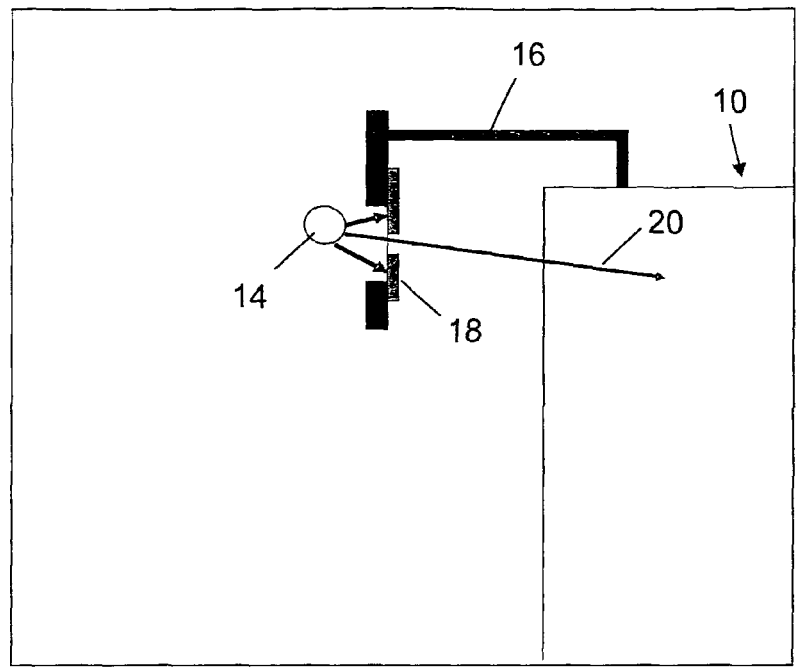
FIG. 3 and FIG. 4 show two examples of means for limiting the footprint of the radiation emitting source on the first lens.
Figure 4:
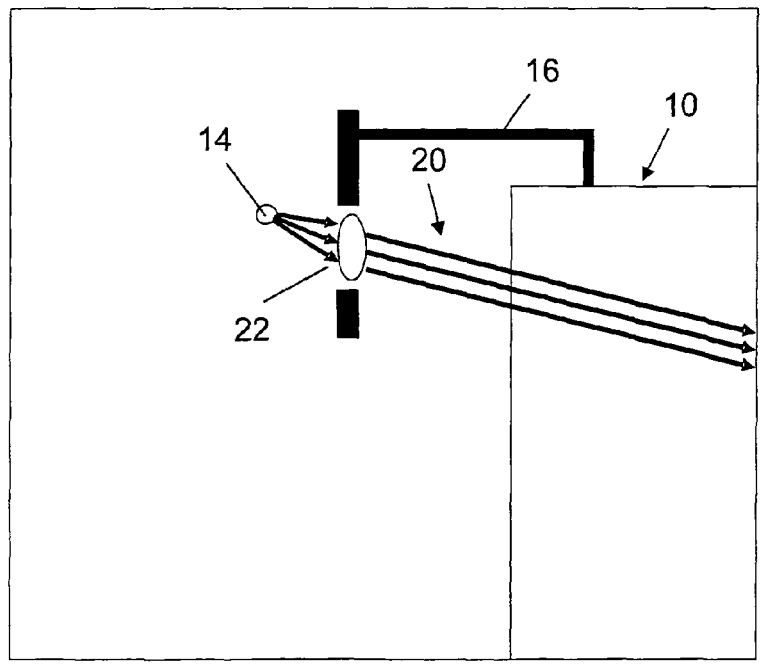

In order to apply the method of the invention to any type of optical system, means are provided to limit the footprint of the radiation emitting source on the first lens. Examples of means of limiting the spot size of the image of the radiation emitting source on the detector are shown in FIG. 3 and FIG. 4. In both figures radiation source 14 is shown supported by holder 16 in front of and near the outer edge (as measured in the plane perpendicular to the principal optical axis of the element) of the first optical element of the system 10. In the embodiment shown in FIG. 3 a pinhole 18 is supported by holder 16 in front of and close to the radiation emitting source 14. The pinhole will only allow the pencil 20 comprised of rays which are approximately close to collimated to enter the optical system and will block the rays that are radiated at larger angles as shown in the figure. In the embodiment shown in FIG. 4, a lens 22 is supported by holder 16 a distance equal to its focal length in front of radiation emitting source 14. This causes the pencil 20 of rays entering the optical system 10 to be collimated, i.e. the source 14 appears to be located at infinity. The second embodiment is preferred since it creates a smaller image spot with higher energy efficiency per unit area on the detector.

Figure 2:
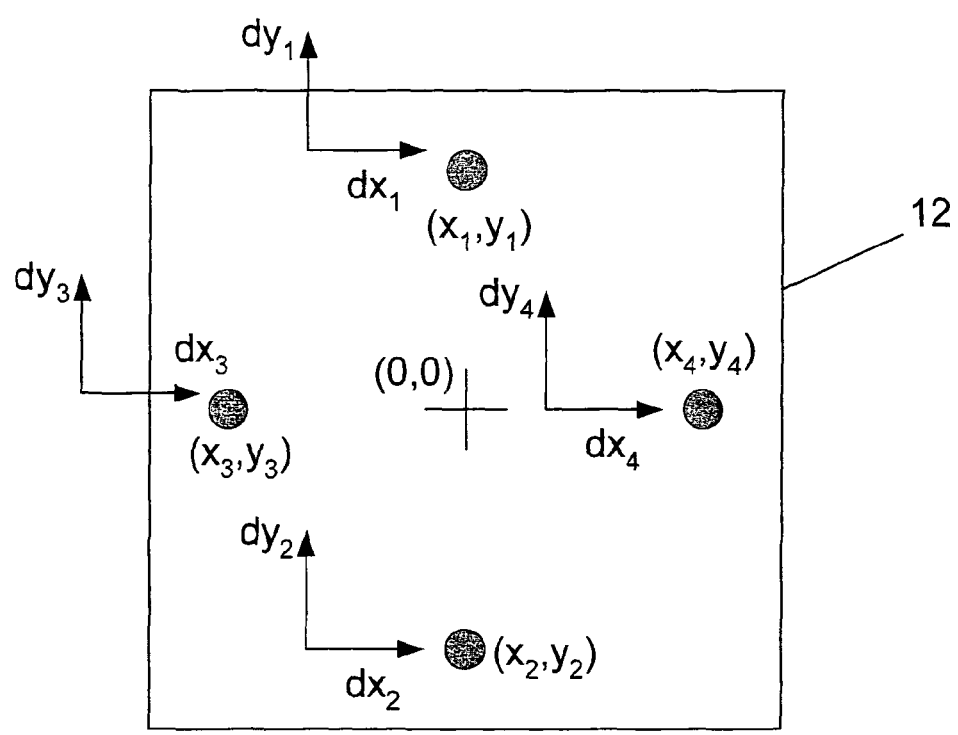
FIG. 2 schematically shows the principal of the method of the invention.

FIG. 2 schematically shows the principal of the method of the invention. On the surface of detector 12, which is typically a CCD or CMOS detector, can be seen the spots $(x_i, y_i)$ that are the images of radiation emitting sources $14_i$ to $14_4$. Spots $(x_i, y_i)$ are the pixel locations of the centers of the respective images measured relative to a Cartesian coordinate system having its origin (0,0) at the center of the pixel array of the detector. The initial location $(x_{i0}, y_{i0})$ of each of the spots is measured and stored in the processor of the system during the initial alignment and calibration of optical system 10 (including radiation emitting sources 14), which is carried out under standard conditions at the factory or in a test facility. After it has been aligned and calibrated optical system 14 is installed in the platform on which it will operate. During operation of the optical system 10, the system of the invention will be activated as described hereinbelow. Any shift in effective focal length and boresight relative to the original values will result in a corresponding shift in the location of the center of the spots $(x_{i0}, y_{i0})$ on the surface of the detector. These shifts are indicated in FIG. 2 by the arrows $dx_i$ and $dy_i$.

The optical assembly of the invention includes a processing unit that is connected to the radiation sources 14 on the one hand and to the detector 12 on the other hand. The processor comprises software that enables it to control circuitry that will activate the radiation sources as described hereinbelow as well as algorithms that use the originally measured locations of the spots $(x_{i0}, y_{i0})$ and the presently measured locations of the spots $(x_i, y_i)$ to determine the values of $dx_i$ and $dy_i$ from which the shifts of the boresight and effective focal length are then calculated using the basic equations described below. The calculated shifts are then used as input to correct the boresight factor and effective focal length in the image processing algorithms that are used to produce the image of the distant scene. While the processor of the system of the invention can be a dedicated unit it is clear that in most situations only relatively minor additions to the software of the processors that are supplied with the optical systems of the type for which the invention is intended will be necessary to adapt them to carry out the method of the invention in addition to their normal tasks.

The method of the invention for measuring and correcting the deviation of focal length and of boresight due to temperature changes comprises the following steps:

(a) (referring to FIG. 1, FIG. 3, and FIG. 4) A plurality of radiation emitting sources $14_i$, typically either two or four, are fixedly attached to a position in front of the first optical element of the optical system 10 and arranged such that an image of each of them, which is transmitted through the entire optical system, is formed on detector 12. Each member $14_i$ of a pair of the radiation sources is positioned near one of the opposite ends of a straight line passing through the center of the optical element.

(b) (referring to FIG. 2) The center of the detector is defined as the zero point (0,0) of a coordinate system in which the zero position $(x_{i0}, y_{i0})$ of the image of source $14_i$, where i=1, 2, ... n is measured at standard (room) temperature during the initial alignment/calibration of the optical system and system of the invention. The set of measured coordinates $(x_{i0}, y_{i0})$ represents the reference point from which temperature induced shifts will be measured. The coordinates ($x_{i0}, y_{i0}$) are stored in the memory of the processor.

(c) (assuming that a deviation caused by a change in temperature has taken place) The shifted locations of each of the images of the radiation emitting sources ($x_i, y_i$) is measured relative to (0,0). Next, the shift $dx_i$ and $dy_i$ of each spot ($x_i, y_i$) along the X and Y axis respectively is measured relative to the reference point ($x_{i0}, y_{i0}$), where "i" is the spot index (i=1 ... n).

(d) The shift of the boresight value along the X and Y axis respectively is calculated from the average of the translations of the spots according to the following formulas:

$$\text{boresight\_}x = (dx_1 + dx_2 + \ldots + dx_n)/n$$

$$\text{boresight\_}y = (dy_1 + dy_2 + \ldots + dy_n)/n$$

(e) The shift of the boresight of the optical system caused by the change in temperature is now corrected by adding the values of boresight_x and boresight_y respectively to the nominal x and y position of the boresight, i.e. the position measured in the calibration step (b).

(f) As previously mentioned the shift of the effective focal length is manifested by the image on the detector either gets larger or smaller. Therefore the change in the distance between two points exactly opposite each other on the edge of the detector is measured then this change is directly related to the change in the effective focal length (effl). Expressed mathematically, the deviation of the effective focal length $\Delta$effl can be determined based on the shift of pairs of spots:

For a two source system:

$$\Delta\text{effl} = (dy_1 - dy_2)/2$$

For a four source system:

$$\Delta\text{effl} = (dy_1 - dy_2 + dx_3 - dx_4)/4$$

As can be seen from the description given above, the method of the invention does not require knowledge of the temperature of the optical system or the temperature gradient upon the individual optical elements in order to calculate the shift in boresight or effective focal length relative to room temperature. This is a great advantage over the prior art.

An additional advantage of the method of the invention is that the spots appearing on the detector may also be utilized to carry out a method for active focusing of the optical system. In particular when a collimating lens 22 is used in front of each source of radiation 14, then the size in pixels of the spot on the detector is directly related to the focus of the optical system. The spot will have its minimum size when the optical system 10 is focused. The method then involves using a procedure analogous to that described hereinabove to measure the differential changes in size of each of the images, averaging over their sizes, and adjusting the lens assembly of the optical system to shift the focus accordingly. These steps may be reiterated several times until a minimum size of the images of the sources is achieved. This method of correcting the focus of the optical system can be carried out either separately or concurrently with the method for correcting the effective focal length and boresight.

In actual operation, the radiation sources of the system of the invention are activated according to a protocol that varies according to the circumstances of the mission. If their images fall on the border of the detector in areas that are not utilized for imaging the scene being viewed by the optical system, then theoretically the radiation sources could be activated continuously allowing for continuous monitoring and correction of the boresight, effective focal length, and focus of the optical system simultaneously with continuously collecting images of the distant scene. Continuous operation however is not normally necessary or practical. Normally the radiation sources are operated intermittently for short periods of time. The frequency and duty cycle of activation can be determined as a function of time, e.g. for one second every two minutes, or as a function of some other parameter such as ambient temperature or temperature change, e.g. every time the ambient temperature changes by $\pm 10°$ C. Activation can also be either manual or automatic based on deterioration of the main image quality. Optionally, in systems with a large exit pupil, a shutter device can be added to the system to block out the radiation from the distant scene when the sources of the invention are activated to prevent problems in determining the shifts of the spots caused by overlapping signals from the scene image.

The accuracy of the measured values of the shifts of location of the spots and of spot size for focus correction can be improved by averaging over the coordinates and sizes from several consecutive picture frames. Another way of improving the accuracy of these measurements is to provide more pairs of radiation emitting sources located at the vicinity of the outer surface of the front lens of the optical system, thereby creating multiple images around the periphery area of the detector, which can be used to find the average values.

Although embodiments of the invention have been described by way of illustration, it will be understood that the invention may be carried out with many variations, modifications, and adaptations, without exceeding the scope of the claims.

The invention claimed is:

1. A method for measuring and correcting a shift in boresight, effective focal length, and/or focus of an optical system that is caused by temperature variations, said method comprising:

(a) providing one or more radiation emitting sources;
   (b) fixedly attaching radiation emitting sources to a support frame or to a first optical element of said optical system such that they are located in front of and near an outer edge of said first optical element;
   (c) providing means to limit the size of a footprint of said radiation emitting sources on said first optical element of said optical system when said radiation emitting sources are activated;
   (d) activating said radiation sources and measuring in a selected coordinate system initial locations of a center and/or initial sizes of images of said radiation emitting sources that are formed on a detector, wherein said measurements are made with said optical system at standard temperature;
   (e) activating said radiation sources and measuring in said selected coordinate system the shifted locations of the center and/or new sizes of said images of said radiation emitting sources that are formed on said detector, wherein said measurements are made with said optical system at a temperature that is different from said standard temperature;
   (f) using a processor to calculate shifts $dx_i$ and $dy_i$ between said initial locations and said shifted locations along X and Y axes of said selected coordinate system and/or to measure changes in size of said images of said radiation emitting sources;
   (g) measuring and correcting said shift in said boresight and said effective focal length of said optical system that is caused by the change from said standard temperature to said different temperature; and/or (h) correcting said shift of focus of said optical system that is caused by the change from said standard temperature to said different temperature;
wherein frequency and duty cycle at which the radiation emitting sources are activated is determined according to one of the following:
(a) as a function of time;
(b) as a function of temperature;
(c) as a function of temperature change; or
(d) as a function of image quality.

2. A method according to claim 1, wherein the radiation emitting source is a resistor, which is activated by causing an electric current to flow through the resistor.

3. A method according to claim 1, wherein the radiation emitting source is a photodiode, which is activated by causing an electric current to flow through the photodiode.

4. A method according to claim 1, wherein the means to limit the size of the footprint of the radiation emitting source is a pinhole located in front of and close to said radiation emitting source.

5. A method according to claim 1, wherein the means to limit the size of the footprint of the radiation emitting source is a lens located a distance equal to the lens's focal length in front of said radiation emitting source.

6. A method according to claim 1, wherein the selected coordinate system is a Cartesian coordinate system having an origin at the center of pixel array of the detector.

7. A method according to claim 1, wherein the processor is a dedicated unit.

8. A method according to claim 1, wherein the processor is a component of the optical system, wherein the necessary additions have been made to the software of said processor to enable the method of the invention to be carried out.

9. A method according to claim 1, wherein the shift of the boresight value along the X axis and Y axis respectively of the selected coordinate system is calculated from an average of translations of the images of the radiation emitting sources according to the following formulas:

$$\text{boresight\_}x = (dx_1 + dx_2 + \ldots + dx_n)/n$$

$$\text{boresight\_}y = (dy_1 + dy_2 + \ldots + dy_n)/n.$$

10. A method for measuring and correcting a shift in boresight, effective focal length, and/or focus of an optical system that is caused by temperature variations, said method comprising:
(a) providing one or more radiation emitting sources;
(b) fixedly attaching radiation emitting sources to a support frame or to a first optical element of said optical system such that they are located in front of and near an outer edge of said first optical element;
(c) providing means to limit the size of a footprint of said radiation emitting sources on said first optical element of said optical system when said radiation emitting sources are activated;
(d) activating said radiation sources and measuring in a selected coordinate system initial locations of a center and/or initial sizes of images of said radiation emitting sources that are formed on a detector, wherein said measurements are made with said optical system at standard temperature;
(e) activating said radiation sources and measuring in said selected coordinate system the shifted locations of the center and/or new sizes of said images of said radiation emitting sources that are formed on said detector, wherein said measurements are made with said optical system at a temperature that is different from said standard temperature;
(f) using a processor to calculate shifts $dx_i$ and $dy_i$ between said initial locations and said shifted locations along X and Y axes of said selected coordinate system and/or to measure changes in size of said images of said radiation emitting sources;
(g) measuring and correcting said shift in said boresight and said effective focal length of said optical system that is caused by the change from said standard temperature to said different temperature; and/or
(h) correcting said shift of focus of said optical system that is caused by the change from said standard temperature to said different temperature;
wherein, for two radiation emitting sources having images respectively located on either the positive X axis and the negative X axis or on the positive Y axis and the negative Y axis of the selected coordinate system, the shift of the effective focal length (Δeffl) along the X axis and Y axis respectively of the selected coordinate system is calculated from the average of the translations of the images of the radiation emitting sources according to the following formula:

$$\Delta\text{effl} = (dy_1 - dy_2)/2.$$

11. A method for measuring and correcting a shift in boresight, effective focal length, and/or focus of an optical system that is caused by temperature variations, said method comprising:
(a) providing one or more radiation emitting sources;
(b) fixedly attaching radiation emitting sources to a support frame or to a first optical element of said optical system such that they are located in front of and near an outer edge of said first optical element;
(c) providing means to limit the size of a footprint of said radiation emitting sources on said first optical element of said optical system when said radiation emitting sources are activated;
(d) activating said radiation sources and measuring in a selected coordinate system initial locations of a center and/or initial sizes of images of said radiation emitting sources that are formed on a detector, wherein said measurements are made with said optical system at standard temperature;
(e) activating said radiation sources and measuring in said selected coordinate system the shifted locations of the center and/or new sizes of said images of said radiation emitting sources that are formed on said detector, wherein said measurements are made with said optical system at a temperature that is different from said standard temperature;
(f) using a processor to calculate shifts $dx_i$ and $dy_i$ between said initial locations and said shifted locations along X and Y axes of said selected coordinate system and/or to measure changes in size of said images of said radiation emitting sources;
(g) measuring and correcting said shift in said boresight and said effective focal length of said optical system that is caused by the change from said standard temperature to said different temperature; and/or
(h) correcting said shift of focus of said optical system that is caused by the change from said standard temperature to said different temperature;
wherein, for four radiation emitting sources having images respectively located on the positive X axis and the negative X axis and on the positive Y axis and the negative Y axis of the selected coordinate system, the shift of the effective focal length (Δeffl) along the X axis and Y axis respectively of the selected coordinate system is calculated from the average of the translations of the images of the radiation emitting sources according to the following formula:

$$\Delta \text{effl} = (dy_1 - dy_2 + dx_3 - dx_4)/4.$$

12. A method for measuring and correcting a shift in boresight, effective focal length, and/or focus of an optical system that is caused by temperature variations, said method comprising:
 (a) providing one or more radiation emitting sources;
 (b) fixedly attaching radiation emitting sources to a support frame or to a first optical element of said optical system such that they are located in front of and near an outer edge of said first optical element;
 (c) providing means to limit the size of a footprint of said radiation emitting sources on said first optical element of said optical system when said radiation emitting sources are activated;
 (d) activating said radiation sources and measuring in a selected coordinate system initial locations of a center and/or initial sizes of images of said radiation emitting sources that are formed on a detector, wherein said measurements are made with said optical system at standard temperature;
 (e) activating said radiation sources and measuring in said selected coordinate system the shifted locations of the center and/or new sizes of said images of said radiation emitting sources that are formed on said detector, wherein said measurements are made with said optical system at a temperature that is different from said standard temperature;
 (f) using a processor to calculate shifts $dx_i$ and $dy_i$ between said initial locations and said shifted locations along X and Y axes of said selected coordinate system and/or to measure changes in size of said images of said radiation emitting sources;
 (g) measuring and correcting said shift in said boresight and said effective focal length of said optical system that is caused by the change from said standard temperature to said different temperature; and/or
 (h) correcting said shift of focus of said optical system that is caused by the change from said standard temperature to said different temperature;
 wherein correcting said shift of focus of said optical system is done by:
  determining the differential changes from the initial size of each of the images of the radiation emitting sources;
  averaging over said differential changes in size;
  adjusting a lens assembly of the optical system to shift the focus; and, optionally,
  repeating the steps of determining, averaging and adjusting one or more times to minimize said differential changes in size.

13. A method according to claim 1, wherein the radiation emitting sources are activated continuously.

14. A method according to claim 1, wherein the radiation emitting sources are activated intermittently.

15. A method for measuring and correcting a shift in boresight, effective focal length, and/or focus of an optical system that is caused by temperature variations, said method comprising:
 (a) providing one or more radiation emitting sources;
 (b) fixedly attaching radiation emitting sources to a support frame or to a first optical element of said optical system such that they are located in front of and near an outer edge of said first optical element;
 (c) providing means to limit the size of a footprint of said radiation emitting sources on said first optical element of said optical system when said radiation emitting sources are activated;
 (d) activating said radiation sources and measuring in a selected coordinate system initial locations of the center and/or initial sizes of images of said radiation emitting sources that are formed on a detector, wherein said measurements are made with said optical system at standard temperature;
 (e) activating said radiation sources and measuring in said selected coordinate system the shifted locations of a center and/or new sizes of said images of said radiation emitting sources that are formed on said detector, wherein said measurements are made with said optical system at a temperature that is different from said standard temperature;
 (f) using a processor to calculate shifts $dx_i$ and $dy_i$ between said initial locations and said shifted locations along X and Y axes of said selected coordinate system and/or to measure changes in size of said images of said radiation emitting sources;
 (g) measuring and correcting said shift in said boresight and said effective focal length of said optical system that is caused by the change from said standard temperature to said different temperature; and/or
 (h) correcting said shift of focus of said optical system that is caused by the change from said standard temperature to said different temperature;
 wherein accuracy of the measured values of the shifts of location of the images of the radiation emitting sources and of the image size for focus correction can be improved by averaging over the coordinates and sizes from several consecutive picture frames.

16. A system adapted to enable performing the method of claim 1 for measuring and correcting the shift in the boresight, effective focal length, and/or focus of an optical system that is caused by temperature variations, said system comprising:
 (a) one or more radiation emitting sources fixedly attached to the support frame or to the first optical element of the optical system such that they are located in front of and near the outer edge of the first optical element; and
 (b) a processor comprising software that adapted to enable the method of claim 1 to be carried out.

* * * * *